US006780252B1

(12) United States Patent
Holst

(10) Patent No.: US 6,780,252 B1
(45) Date of Patent: Aug. 24, 2004

(54) METHOD OF CLEANING A LAWN MOWER

(76) Inventor: Dean H. Holst, 2866 Greenboro Cir., Ames, IA (US) 50014

( * ) Notice: Subject to any disclaimer, the term of this patent is extended or adjusted under 35 U.S.C. 154(b) by 0 days.

(21) Appl. No.: 10/620,941

(22) Filed: Jul. 14, 2003

Related U.S. Application Data

(62) Division of application No. 09/723,062, filed on Nov. 27, 2000, now abandoned.
(60) Provisional application No. 60/168,409, filed on Dec. 1, 1999.

(51) Int. Cl.[7] .............................. B08B 1/00; B08B 7/00; A47L 13/02
(52) U.S. Cl. .................... 134/6; 134/42; 15/236.01; 15/236.09; 30/169
(58) Field of Search .................... 134/6, 42; 15/236.01, 15/236.04, 236.09; 30/169; D32/46, 49

(56) References Cited

U.S. PATENT DOCUMENTS

| 462,445 | A | 11/1891 | Metzger |
|---|---|---|---|
| 2,359,408 | A | 10/1944 | Disse |
| 3,070,823 | A | 1/1963 | Heinig |
| 3,665,605 | A | 5/1972 | Howerter |
| 4,355,432 | A | 10/1982 | Storm, Jr. |
| 4,485,516 | A | 12/1984 | Crook |
| 5,020,181 | A | 6/1991 | Leonard |
| D326,593 | S | 6/1992 | Ward |
| D356,409 | S | 3/1995 | Kanaskie |
| 5,477,583 | A | 12/1995 | Deloe |
| 6,098,292 | A | 8/2000 | Harpell |
| D431,101 | S | 9/2000 | Gracy |

*Primary Examiner*—Mark Spisich
*Assistant Examiner*—Laura C Cole
(74) *Attorney, Agent, or Firm*—McKee, Voorhees & Sease, P.L.C.

(57) ABSTRACT

A lawn mower cleaning tool includes an elongated handle and a cleaning blade attached to one end of the handle. The handle has opposite ends, a longitudinal axis, and a length greater than the radius of the mower blade. An angled cleaning blade member attaches to one of the ends of the handle. The blade member includes a shank portion extending longitudinally from the handle and a scraping blade portion attached to the shank portion and diverging therefrom in a radial direction. Thus, the mower deck can be cleaned without the operator's hands entering into close proximity with the mower blade.

8 Claims, 6 Drawing Sheets

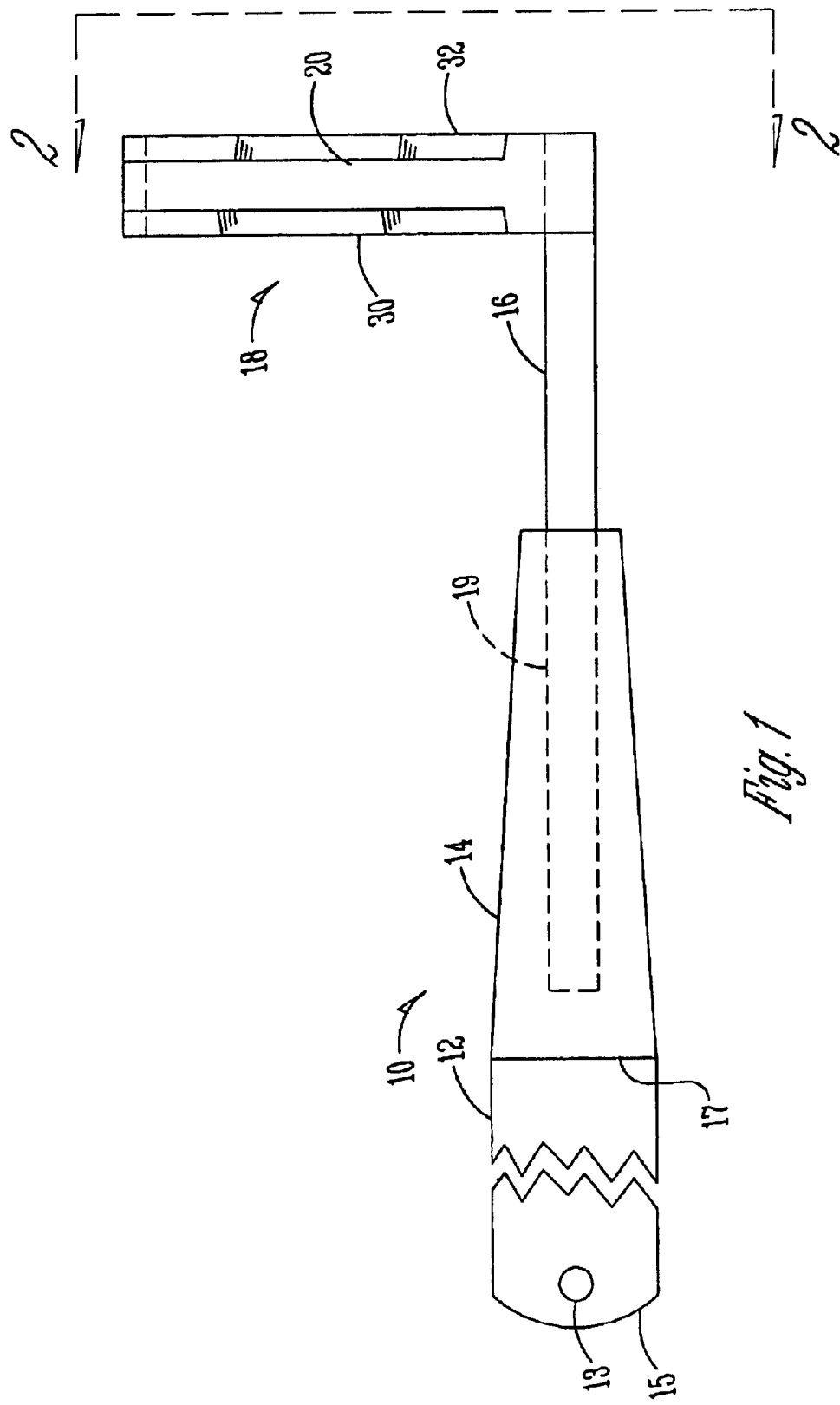

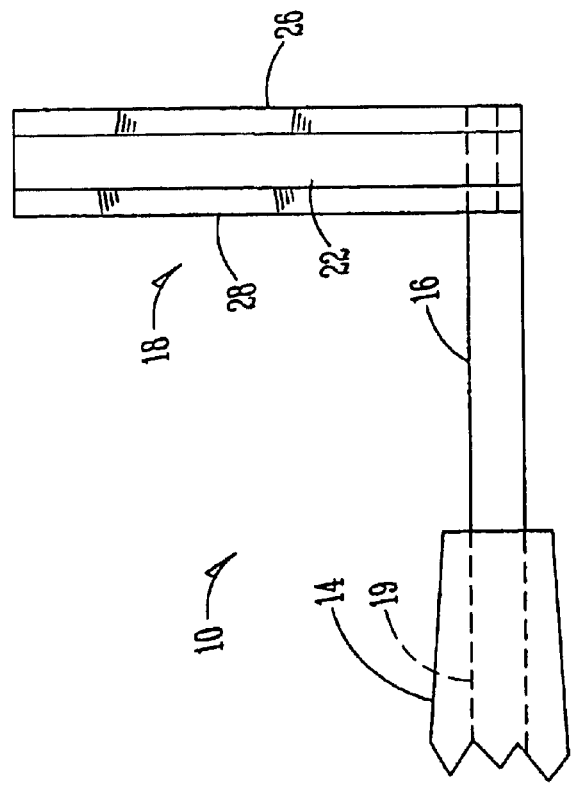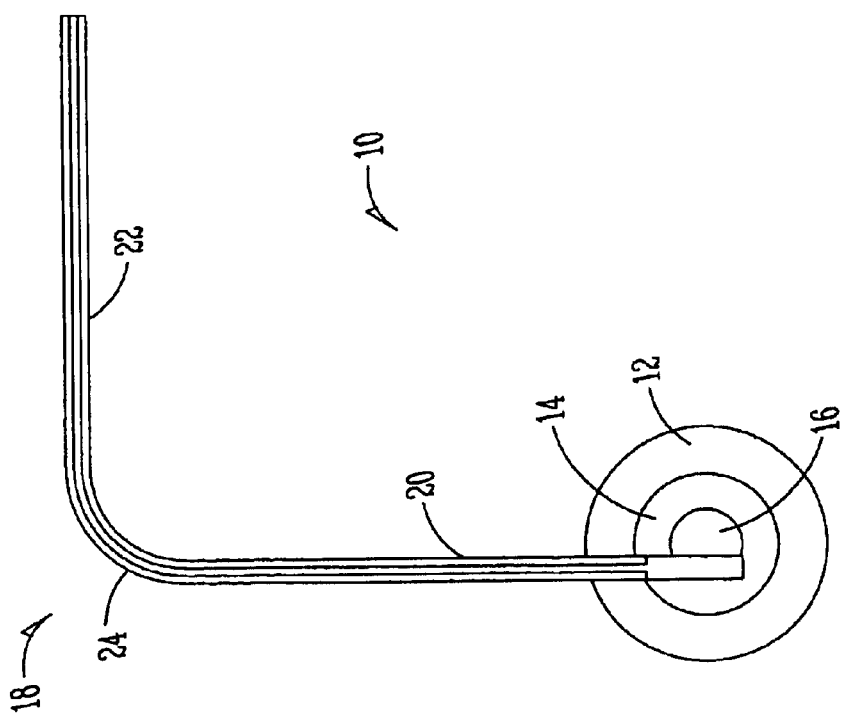

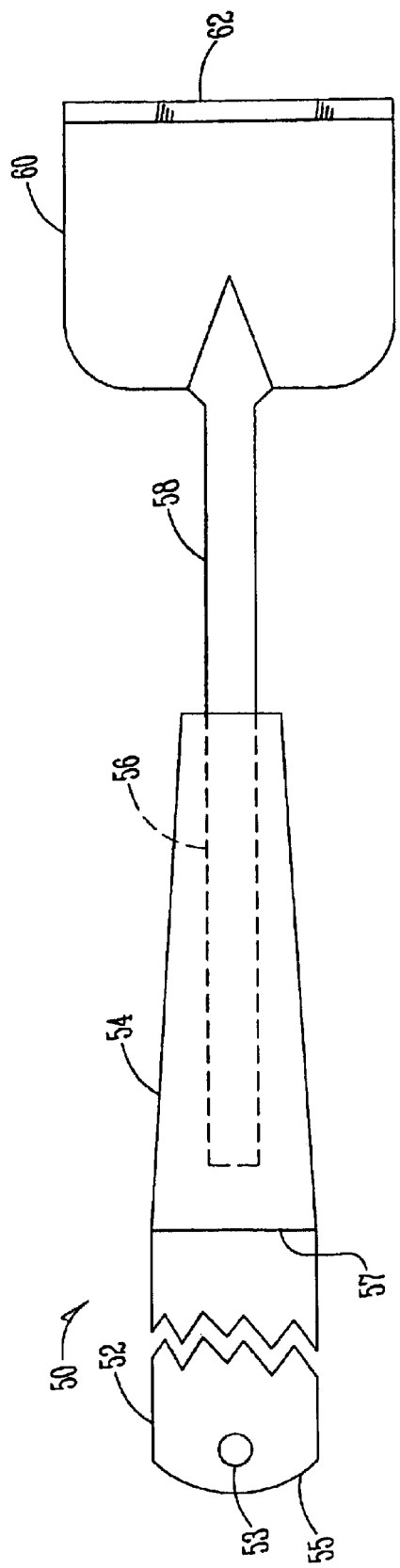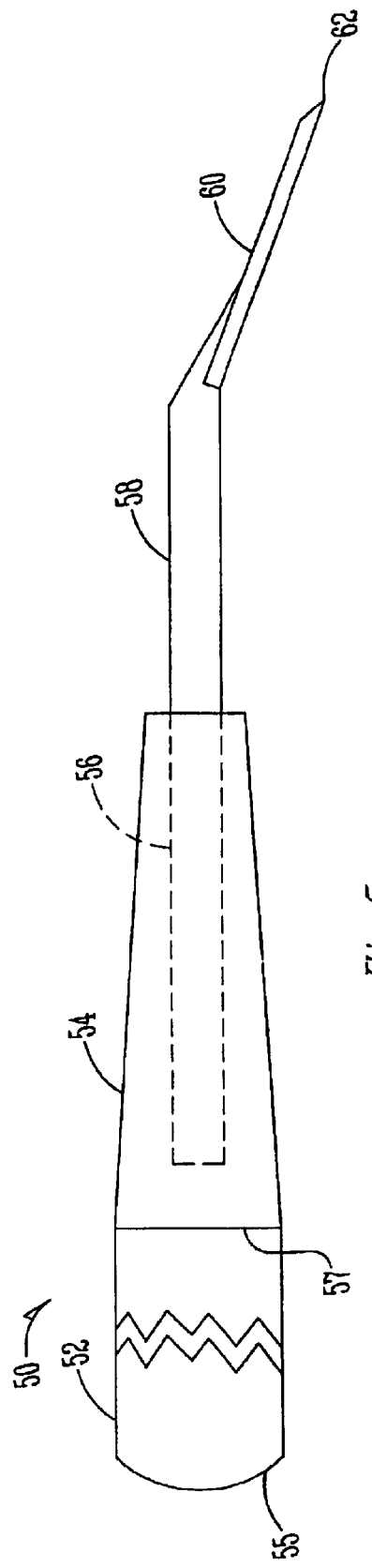

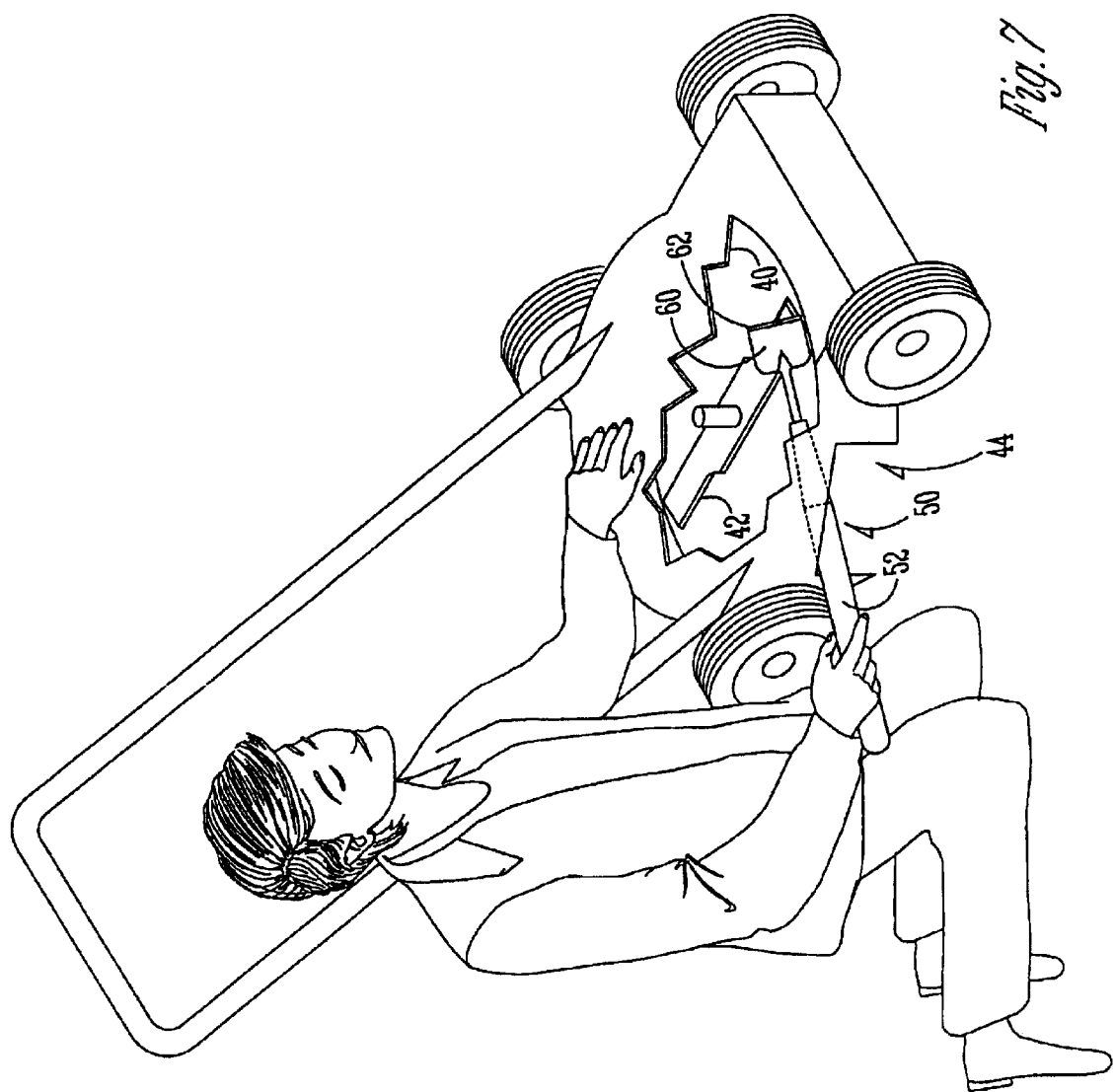

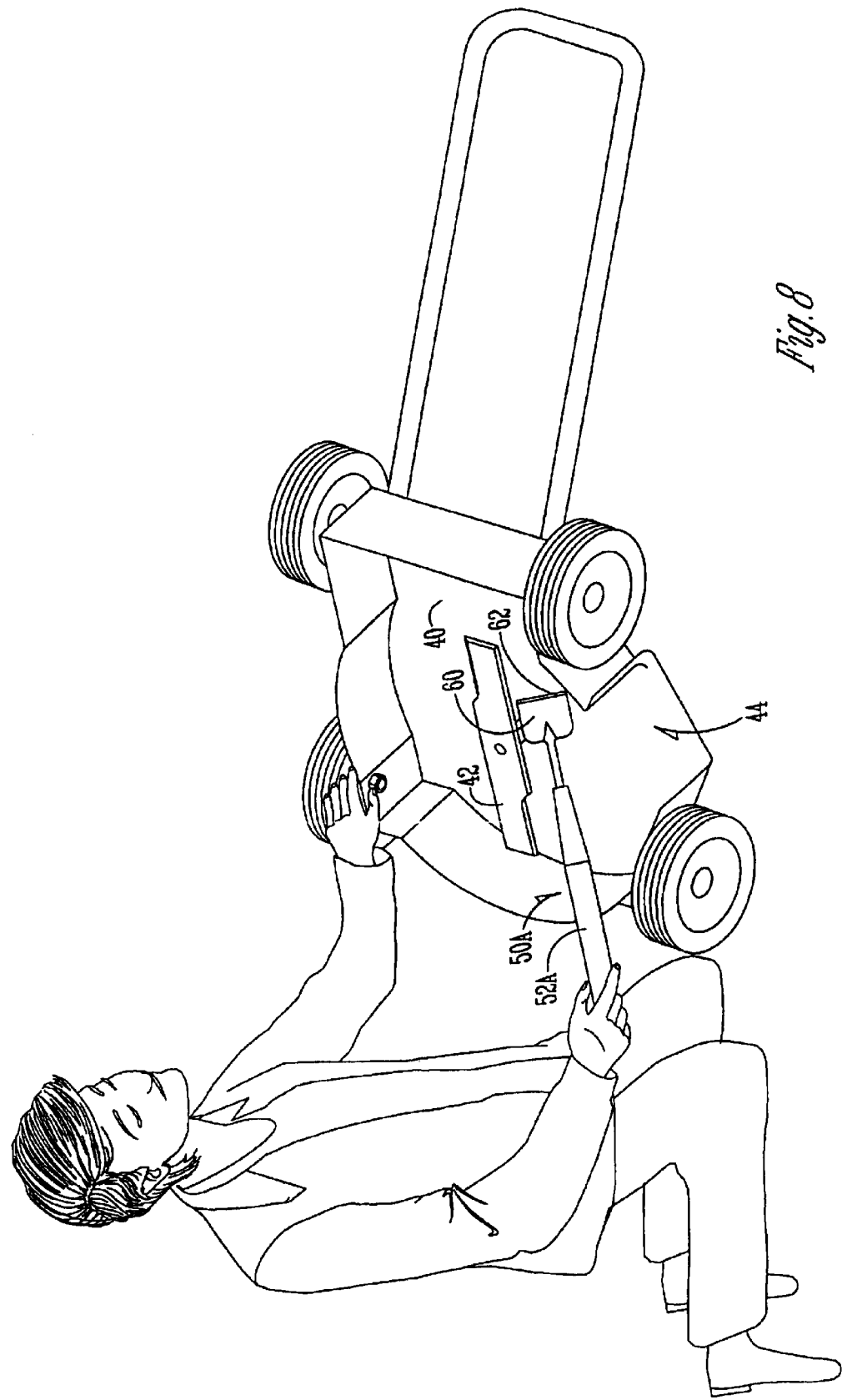

METHOD OF CLEANING A LAWN MOWER

CROSS-REFERENCE TO RELATED APPLICATIONS

This application is a Divisional of a application, Ser. No. 09/723,062, filed on Nov. 27, 2000, now abandoned, and is based upon and claims the priority of U.S. Provisional Patent Application Ser. No. 60/168,409, filed Dec. 1, 1999.

BACKGROUND OF THE INVENTION

A. Field of the Invention

The present invention relates to lawn mowers. More specifically, the present invention relates to mower cleaning tools that are designed to clean both riding and push lawn mowers.

B. Problems in the Art

As a lawn mower cuts through grass, a large quantity of grass sticks to the mower's blade and to the underside of the mower's deck. The grass that sticks to the underside of the mower's deck and blade can cause a number of problems. For instance, wet grass can lead to corrosion of the blade. The corrosion of the blade due to the grass and the moisture within the grass can lead to dulling of the blade. In addition, grass can obstruct airflow underneath the mower's deck, and in many mowers, particularly newer mulching mowers, the mower is designed for a particular airflow pattern within the mower's deck. Finally, grass that has stuck to the underside of the mower's deck will oftentimes fall off the mower's deck after the mower has been put into a storage area, leading to a dirty storage area.

To alleviate the problems associated with grass stuck to the mower's blade and the underside of the mower's deck, people have used a variety of tools and methods to clean both riding mowers and push mowers. One common method of cleaning the underside of the deck of a riding mower involves removing the deck, along with the blades. After the blades and deck are removed, they are scraped with a conventional putty knife. One drawback to this method is that it requires a great deal of time to remove the lawn mower deck. In addition, the putty knife does not have much surface area with which to scrape the deck. Thus, considerable time is required to clean the deck once it has been removed.

A second common method of cleaning a riding mower involves elevating the front end of the mower with a jack or other elevation apparatus. Then, as in the previous example, the putty knife is used to scrape the underside of the mower's deck and the mower's blades. However, the use of a jack to elevate the riding mower leads to safety concerns in that the jack could collapse and injure someone underneath the mower. In addition, the use of a putty knife underneath the mower is unsatisfactory. Due to the short handle on the putty knife, a user's hand will sometimes strike the mower blade while cleaning the deck, often cutting the hand in the process.

A common method of cleaning a push mower includes turning the mower over and once again scraping both the blade and the deck with a putty knife. As previously described, the short handle of the putty knife brings the hands in close proximity to the blade. When the hand is near the blade, it will often strike the blade and cut the hand. In addition, the putty knife is not set at an angle relative to the handle on the putty knife. Angling of the cutting blade relative to the handle would increase the cleaning effectiveness of the mower tool.

Therefore, it is a primary objective of the present invention to provide a riding lawn mower cleaning tool that allows for cleaning of the mower's deck without a need to remove the deck.

It is a further object of the present invention to provide a lawn mower cleaning tool that can be used without requiring the use of a jack to elevate the mower.

It is a further object of the present invention to provide a lawn mower cleaning tool which will keep hands and arms away from the blades while still allowing effective cleaning of the mower deck and the mower blades.

It is a further object of the present invention to provide a push mower cleaning tool which has a grip of sufficient size that a lawn mower deck can be cleaned while the hand remains distant from the mower blade.

It is a further object of the present invention to provide a push mower cleaning tool that has a blade that is angled relative to the handle to allow for more efficient cleaning of the mower deck and the mower blade.

It is a further object of the present invention to provide riding and push mower cleaning tools that provide a better looking lawn by promoting even grass cut by keeping blades from dulling, and grass clippings from bunching due to grass sticking to the underside of the mower's deck.

These, as well as other objects and features of the present invention, will be apparent from the following detailed description and claims in conjunction with the accompanying drawings.

SUMMARY OF THE INVENTION

The present invention relates to lawn mower cleaning tools. In a first embodiment, a riding lawn mower cleaning tool includes an elongated handle and a cleaning blade attached to one end of the handle. The cleaning blade includes a shaft attached to the handle and a generally L-shaped scraping blade attached to the shaft. A first leg of the scraping blade extends upward and the second leg of the scraping blade extends horizontally when the handle is oriented horizontally. This permits the scraping blade to scrape under the mower deck and around the inside of its circumferential wall while a portion of the handle remains available outside the mower deck for the user to hold.

In a second embodiment, a push mower cleaning tool includes a handle with a cleaning blade attached to one end of the handle. The cleaning blade includes a shaft and a scraping blade that extends at an angle relative to the handle and shaft. In both embodiments, the handle is of sufficient length when compared to the diameter of the mower deck such that the underside of the deck can be cleaned without the operator's hands entering into close proximity with the mower blade.

In a third embodiment, a push mower cleaning tool similar to the second embodiment has shorter handle, which requires the mower deck to be tipped over or tipped on its side for cleaning. However, the handle is still long enough to keep the operator's hands away from the mower blade.

BRIEF DESCRIPTION OF THE DRAWINGS

FIG. 1 is a side elevational view of a riding lawn mower cleaning tool according to the present invention. The elongated handle is shown broken to conserve space in the illustration.

FIG. 2 is an end elevational view of the riding lawn mower cleaning tool of FIG. 1.

FIG. 3 is a partial side elevation view showing greater detail of the angled blade member of FIG. 1.

FIG. 4 is a top plan view of a push lawn mower cleaning tool according to the present invention. The elongated handle is shown broken to conserve space in the illustration.

FIG. 5 is a side elevational view of the angled blade lawn mower cleaning tool of FIG. 4.

FIG. 7 is a perspective view showing the cleaning tool of FIG. 4 in use.

FIG. 8 is a perspective view showing a shorter handle embodiment of the cleaning tool of FIG. 4 in use.

DETAILED DESCRIPTION OF EXEMPLARY EMBODIMENTS

Figure 6:
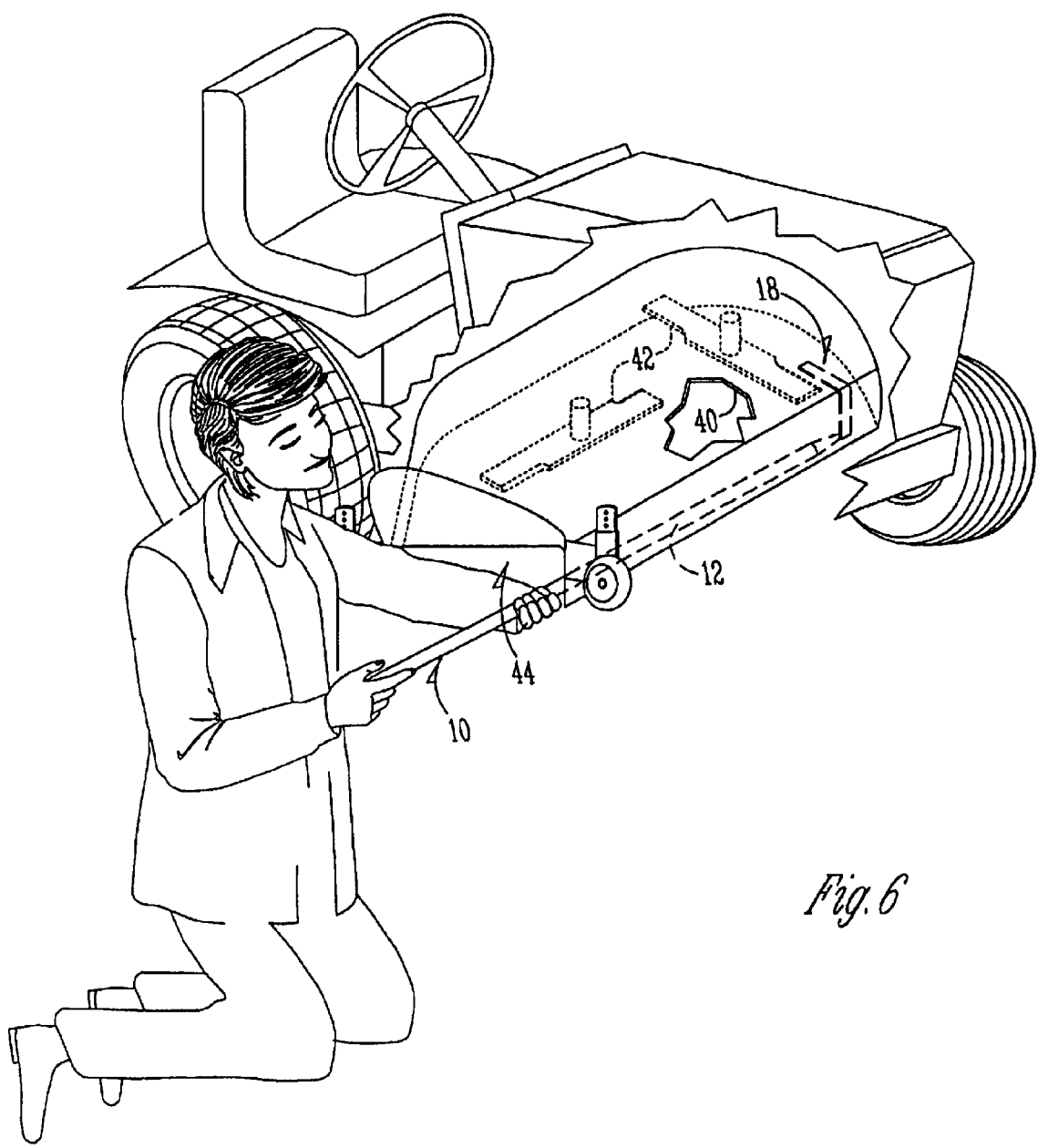
FIG. 6 is a perspective view showing the cleaning tool of FIG. 1 in use.

FIG. 1 shows a side elevational view of a riding lawn mower cleaning tool 10 according to the present invention. The riding lawn mower tool 10 has a wooden handle 12. The handle could be made from other materials. The handle 12 has a hole 13 through the handle 12 at one end 15 of the handle 12. The hole 13 allows the tool 10 to be hung up when the tool 10 is not being used. A metal collar 14 is connected to the second end 17 of the handle 12. The collar 14 can be connected to the handle 12 by any conventional means.

Within the metal collar 14 there is a bore 19. The bore 19 is designed to receive the steel shaft or shank 16 of a cleaning blade member. The steel shaft 16 can be forced into the bore 19 to create a friction fit between the bore 19 and the steel shaft 16. Other means could be utilized to attach the steel shaft to the handle.

A steel scraping blade 18 is attached to the steel shaft 16. The steel shaft 16 and the steel blade 18 could be integral wherein they are formed from the same piece of steel. However, in most situations, the steel blade 18 will be welded to the steel shaft 16.

As can best be seen in FIG. 2, the steel blade 18 is a generally L-shaped strip of rigid material comprised of two portions or legs. The steel blade 18 includes an upright or vertical portion 20 and a horizontal portion 22. As shown in FIG. 2, the transition between the upright portion 20 and the horizontal portion 22 comprises an arc 24 or curved corner with a generous radius, for example a one-half inch radius. Of course, other degrees of curvature could be used depending on the radius found at the interior corner of the mower deck. Referring to FIGS. 1 and 2, the inside or trailing edge 30 and the outside or leading edge 32 of the upright portion 20 are sharpened or tapered to provide better cleaning action.

FIG. 3 shows a top view of the riding lawn mower cleaning tool 10 according to the present invention. In FIG. 3, the cleaning edges of the horizontal portion 22 of the scraping blade 18 can be seen. The horizontal portion 22 includes an interior or trailing edge 28 and an exterior or leading edge 26. Both of these edges are preferably either sharpened or tapered. Sharpening of these edges allows for more effective cleaning of the mower deck and blade.

Referring to FIGS. 2 and 6, the upright portion 20 should be of sufficient length to allow the horizontal portion 22 to reach the mower upper interior deck surface 40 (see FIG. 6). In many riding mowers, the interior portion of the deck is recessed above the mower blade 42. Therefore, the interior portion of the deck may be higher than the grass chute 44. The handle 12 of the tool 10 cannot be raised above the grass chute. Therefore, the upright portion 20 should be long enough to allow the horizontal portion 22 to contact the mower blade 42 and the deck surface 40 even when the deck surface 40 is recessed significantly above the mower blade 42.

As can best be seen in FIG. 6, the scraping blade 18 of the cleaning blade member is adapted so that it fits within the grass chute 44 of the riding mower. The handle 12 is of sufficient length to allow the blade 18 of the cleaning tool 10 to reach the far side of the deck without requiring that an operator reach underneath the deck with his hands. Thus, the handle 12 has a length that is greater than the maximum dimension of the mower deck.

FIG. 4 shows a top view of a push mower cleaning tool 50 according to the present invention. The push mower cleaning tool 50 has a wooden handle 52. The handle 52 could be made from materials other than wood. The handle 52 has a hole 53 located at one end 55 of the handle 52. The hole allows the tool 50 to be hung up. At the other end 57 of the handle 52 is attached a tapered metal collar 54. The metal collar 54 has a bore 56. The collar 54 can be attached to the handle 52 by any conventional method.

A cleaning blade member is attached to the handle 52. The cleaning blade member includes a steel shaft or shank 58 and a steel scraping blade 60. The steel shaft 58 is inserted into the bore 56. The steel shaft 58 should be of sufficient strength to resist breaking or bending when the cleaning tool 50 is pushed against the lawn mower deck. The shaft 58 is preferably friction fitted within the bore 56. Other means could be used to attach the shaft 58 to the handle 52.

A steel scraping blade 60 is attached to the steel shaft 58. The steel blade 60 and the steel shaft 58 could be integral. However, in most situations the steel blade 60 will be welded to the steel shaft 58. The scraping blade 60 includes a sharpened or tapered leading edge 62. The sharpened leading edge 62 is used to dig grass off of the mower's deck and blade. The sharpened edge 62 can be better seen in FIG. 5.

FIG. 5 shows a side elevational view of the push mower cleaning tool 50 according to the present invention. As seen in FIG. 5, the scraping blade 60 is at an angle that diverges in a radial direction from the longitudinal axis of the shaft 58 and thereby the handle 52. The angle is preferably an acute angle, more preferably about 20 degrees. This angle of the cleaning blade 60 with respect to the handle 52 can also be seen in FIG. 7. Angling of the scraping blade 60 relative to the handle 52 allows for a better cleaning action. Of course, the cleaning blade could be at different angles relative to the shaft 58 and the handle 52.

The scraping blade 60 of the tool 50 can be inserted through the grass chute 44. The handle 52 of the push mower cleaning tool 50 should be long enough so that the upper surface 40 of the underside of the push mower's deck can be cleaned while keeping the hands free from the mower blade 42. This feature of the push mower cleaning tool 50 can best be seen in FIG. 7. As can be seen in FIG. 7, the scraping blade 60 is in contact with the push mower's deck. However, the operator's hands are still at a safe distance from the mower's blade. The handle 52 is long enough to keep the hands free of the blade, thus preventing skinning of the hands or even more serious cuts on the hands. Also, keeping the hands away from the mower's deck allows the hands to stay clean while the mower is being cleaned.

FIG. 8 shows another embodiment 50A of the invention that is similar to the embodiment of FIGS. 4, 5 and 7, except that the handle 52A is shorter. Preferably the handle 52A is at least approximately fourteen inches long, which is still longer than the radius of the mower blade 42 on typical push mowers designed to cut 20–24 inch wide paths. This shorter handle cleaning tool 50A does generally require that the mower deck be tipped over or on its side to allow better access for cleaning.

One skilled in art will appreciate that the tool 10 could be used on a push mower and the tool 50 could be useful in cleaning the deck and/or blade of a riding mower as well.

In the drawings and specification, there have been set forth exemplary embodiments of the invention, and although specific terms are employed, these are used in a generic and descriptive sense only and not for purposes of limitation. Changes in the form and proportion of parts, as well as in the substitution of equivalents, are contemplated as circumstances may suggest or render expedient without departing from the spirit or scope of the invention as further defined in the following claims.

What is claimed is:

1. A method for cleaning a mower deck having an upper surface, a lower surface, and an outer perimeter, the mower having at least one mower blade mounted for rotation about a blade axis below the lower surface of the mower deck for cutting grass, the mower blade having a radius of predetermined length on opposite sides of the blade axis; the method comprising:

taking a lawnmower tool comprising an elongated handle having first and second opposite ends and a longitudinal axis, a shaft extending longitudinally from the handle along the longitudinal axis thereof, and a scraping blade being attached to the shaft and having a sharpened edge facing away from the handle and shaft, the sharpened edge being perpendicular to the longitudinal axis of the handle, the handle having a length greater than the radius of the mower blade;

positioning the sharpened edge of the scraping blade beneath and in contact with the lower surface of the mower deck with the first end of the handle being located beneath the lower surface of the mower deck and with the second end of the handle extending outside the perimeter of the mower deck;

scraping debris from the lower surface of the mower deck by moving the handle in a direction parallel to the longitudinal axis of the handle so that the sharpened edge of the scraping blade scrapes along, and scrapes debris from, the lower surface of the mower deck;

maintaining and gripping a portion of the handle outside the perimeter of the mower deck during the entire scraping step.

2. A method according to claim 1 wherein the blade comprises a flat plate lying in a plane that is at an angle with respect to the longitudinal axis of the tool, the method further comprising pushing the handle to cause the sharpened edge of the blade to scrape debris from the under surface of the deck.

3. A method according to claim 2 wherein the blade lies in a plane that is approximately at a twenty degree angle with respect to the longitudinal axis of the handle, and the method further comprises positioning the tool so that the sharpened edge of the blade is presented upwardly and in contact with the lower surface of the mower deck.

4. A method according to claim 3 and further comprising maintaining the lower surface of the mower deck in a downwardly presented direction during the scraping step.

5. A method according to claim 3 and further comprising inverting the mower deck so that the lower surface of the mower deck is presented in an upward direction during the scraping step.

6. A method according to claim 1 wherein the blade comprises a first leg attached to the shaft and extending perpendicular to the longitudinal axis of the handle, and a second leg attached to the first leg and extending perpendicular to both the longitudinal axis of the handle and the first leg, the sharpened edge being on the second leg, the method further comprising placing the second leg in contact with the lower surface of the mower deck and using the sharpened edge of the second leg to scrape debris from the lower surface of the mower deck.

7. A method according to claim 6 wherein the second leg includes the first mentioned sharpened edge and a second oppositely facing sharpened edge and the method further comprises pushing the handle to cause the first sharpened edge to scrape debris from the lower end to the mower deck and pulling the handle to cause the second sharpened edge to scrape debris from the lower end of the mower deck.

8. A method according to claim 6 wherein the sharpened edge is on both the first and second legs of the leg and the mower deck comprises a horizontal downwardly present surface and a vertical perimetric surface, the method further comprising scraping the sharpened edge of the second leg on the downwardly presented surface of the mower deck and scraping the sharpened edge of the first leg on the vertical perimetric surface of the mower deck.

* * * * *